(12) United States Patent
Waldorf

(10) Patent No.: US 8,302,074 B1
(45) Date of Patent: Oct. 30, 2012

(54) "IF" AND "SWITCH" AS DRAG AND DROP OBJECTS

(75) Inventor: Jerry A. Waldorf, Woodland Hills, CA (US)

(73) Assignee: Oracle America, Inc., Redwood City, CA (US)

( * ) Notice: Subject to any disclaimer, the term of this patent is extended or adjusted under 35 U.S.C. 154(b) by 1307 days.

(21) Appl. No.: 11/250,749

(22) Filed: Oct. 14, 2005

Related U.S. Application Data

(60) Provisional application No. 60/619,019, filed on Oct. 15, 2004.

(51) Int. Cl.
*G06F 9/44* (2006.01)
*G06F 17/21* (2006.01)
*G06F 3/00* (2006.01)
*G06F 3/048* (2006.01)

(52) U.S. Cl. ........ 717/110; 717/114; 715/234; 715/760; 715/763

(58) Field of Classification Search .................. 717/120, 717/110
See application file for complete search history.

(56) References Cited

U.S. PATENT DOCUMENTS

| | | | | |
|---|---|---|---|---|
| 5,911,145 A * | 6/1999 | Arora et al. | ................... | 715/207 |
| 5,956,736 A * | 9/1999 | Hanson et al. | ................ | 715/234 |
| 6,201,996 B1 * | 3/2001 | Crater et al. | ...................... | 700/9 |
| 6,476,828 B1 * | 11/2002 | Burkett et al. | ................ | 715/760 |
| 6,569,208 B2 * | 5/2003 | Iyer et al. | ...................... | 715/234 |
| 6,714,219 B2 * | 3/2004 | Lindhorst et al. | ............ | 715/769 |
| 6,826,727 B1 * | 11/2004 | Mohr et al. | .................... | 715/235 |
| 6,925,598 B2 * | 8/2005 | Melhem et al. | ............... | 715/210 |
| 6,938,205 B1 * | 8/2005 | Hanson et al. | ................ | 715/234 |
| 7,111,231 B1 * | 9/2006 | Huck et al. | ..................... | 715/205 |
| 7,171,648 B1 * | 1/2007 | Finocchio | .................... | 717/110 |
| 7,194,682 B2 * | 3/2007 | Warrington | ................... | 715/229 |
| 7,398,472 B2 * | 7/2008 | Corrington et al. | ............ | 715/762 |
| 7,451,403 B1 * | 11/2008 | Srinivasan et al. | ............ | 715/763 |
| 7,543,267 B2 * | 6/2009 | Lindhorst et al. | ............. | 717/105 |
| 7,546,602 B2 * | 6/2009 | Hejlsberg et al. | ............. | 719/313 |
| 7,594,181 B2 * | 9/2009 | Rothwein et al. | ............. | 715/763 |
| 7,667,582 B1 * | 2/2010 | Waldorf | ........................ | 340/440 |
| 7,827,527 B1 * | 11/2010 | Chiluvuri | ..................... | 717/109 |
| 7,856,596 B2 * | 12/2010 | Crider et al. | .................. | 715/243 |
| 7,987,234 B1 * | 7/2011 | Waldorf | ........................ | 709/206 |
| 2002/0083097 A1 * | 6/2002 | Warrington | ................... | 707/513 |
| 2003/0023641 A1 * | 1/2003 | Gorman et al. | ............... | 707/530 |
| 2003/0120675 A1 * | 6/2003 | Stauber et al. | ................ | 707/100 |
| 2003/0222910 A1 * | 12/2003 | Guerrero | ....................... | 345/760 |
| 2003/0229607 A1 * | 12/2003 | Zellweger et al. | ................ | 707/1 |
| 2005/0021756 A1 * | 1/2005 | Grant | ........................... | 709/226 |

OTHER PUBLICATIONS

"Introduction to Visual Studio 2005", 2005, retrieved from <http://media.wiley.com/product_data/excerpt/10/04700100/0470010010.pdf>, total pp. 26.*

Simon Zweifel, "Graphical Authoring Tools for Web Content Management", Feb. 27, 2002, retrieved from <http://e-collection.library.ethz.ch/eserv/eth:27705/eth-27705-01.pdf>, total pp. 35.*

* cited by examiner

*Primary Examiner* — Don Wong
*Assistant Examiner* — Marina Lee
(74) *Attorney, Agent, or Firm* — Osha Liang LLP

(57) ABSTRACT

Systems and methods for graphical user interfaces and for presenting content to a user of a graphical user interface are provided. In one implementation, a method for providing a graphical user interface component for a web page is disclosed. The method includes positioning a graphical user interface component on a web page layout, defining one or more conditions associated with the graphical user interface component, and determining content to be displayed at run time if the conditions are satisfied.

12 Claims, 6 Drawing Sheets

"IF" AND "SWITCH" AS DRAG AND DROP OBJECTS

CROSS-REFERENCE TO RELATED APPLICATIONS

This application claims priority to U.S. Provisional Application Ser. No. 60/619,019, filed on Oct. 15, 2004, which is hereby incorporated by reference in its entirety.

BACKGROUND

The present invention relates to graphical user interfaces and systems for presenting content to users of the same.

Conventional enterprises can include a number of different systems for operating different aspects of the enterprise. Typically, the different systems need to be able to communicate and share data. However, some of the enterprise systems may be unable to communicate without extensive human interaction. For example, each system can use a unique platform or operating system as well as a unique method of storing data. Additionally, when an enterprise implements new software or upgrades software to one or more systems, the enterprise can determine that the enterprise systems are incompatible. Conventional integration systems can be used to provide automated communication and data transfer capabilities between the disparate systems within the enterprise.

SUMMARY

The present application includes systems and methods are provided for graphical user interfaces and for presenting content to a user of a graphical user interface ("GUI"). In general, in one aspect, a method for providing a GUI component for a web page is disclosed. The method includes positioning a GUI component on a web page layout, defining one or more conditions associated with the GUI component, and determining content to be displayed at run time if the conditions are satisfied.

In general, in another aspect, a method for providing a GUI component for a web page is disclosed. The method includes positioning a GUI component on a web page layout, defining a first case and a second case associated with the GUI component, and defining one or more conditions associated with the first case and one or more conditions associated with the second case. The method also includes determining a first content to be displayed at run time if the one or more conditions of the first case are satisfied, and determining a second content to be displayed at run time if the one or more conditions of the second case are satisfied.

Implementations of the methods can include one or more of the following features. The method can further include evaluating the one or more conditions at run time and determining whether to display the content according to the evaluation. Positioning the GUI component can include selecting the GUI component from a plurality of pre-built GUI components. Defining the one or more conditions can include receiving a user input defining a condition. Additionally, positioning the GUI component can include opening a page layout designer including a page layout and one or more user selectable GUI component and selecting the GUI component from the one or more GUI components. Positioning can also include moving the selected GUI component to the page layout, and positioning the selected GUI component in a desired position on the page layout.

BRIEF DESCRIPTION OF THE DRAWINGS

Like reference numbers and designations in the various drawings indicate like elements.

DETAILED DESCRIPTION

The ICAN Suite

Figure 1A:
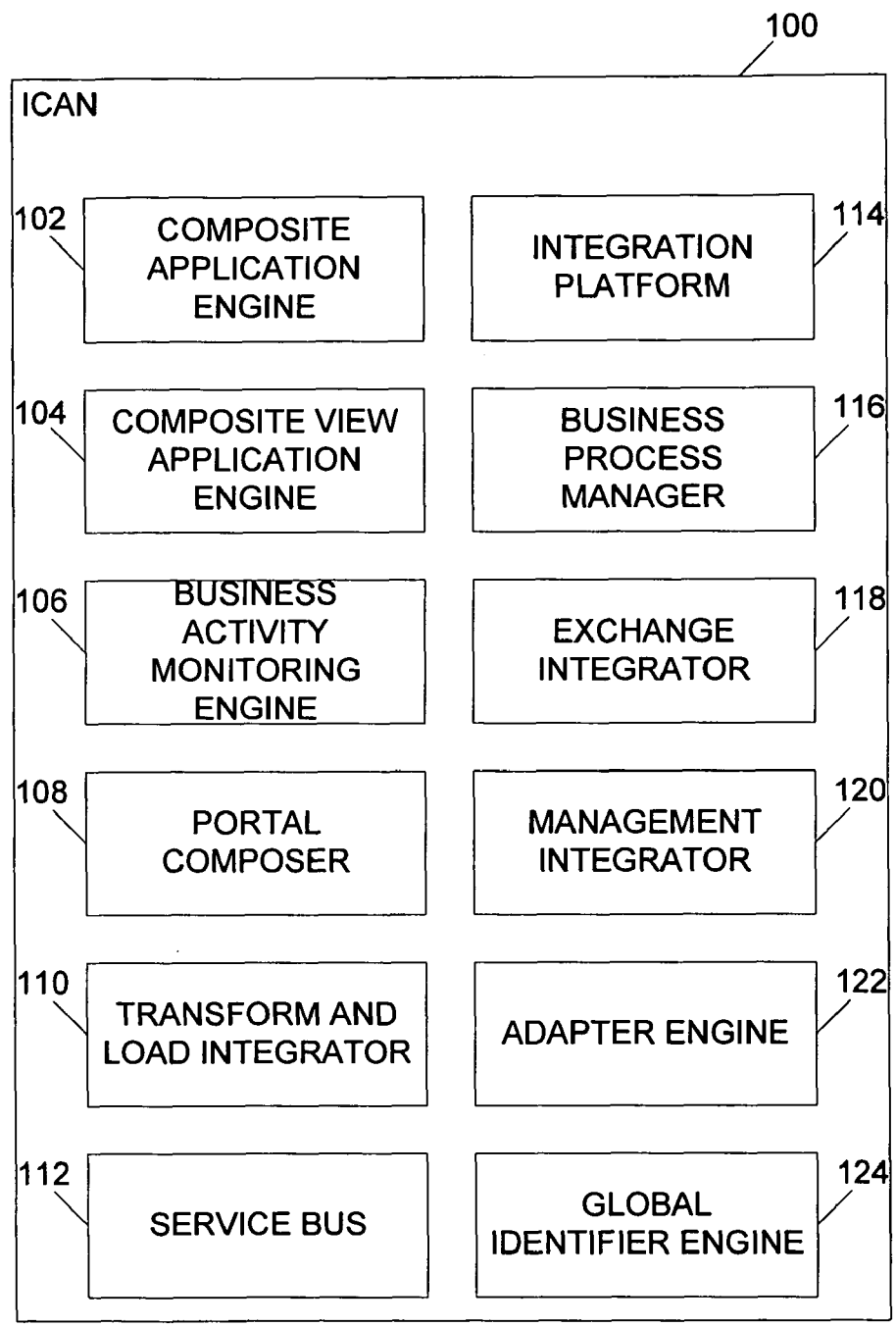
FIG. 1A shows an implementation of the Integrated Composite Application Network ("ICAN") Suite.

In FIG. 1A, an Integrated Composite Application Network ("ICAN") Suite 100 is provided to allow an enterprise to provide configurable and automated business process flows. The ICAN Suite 100 can assemble the functionality of existing applications and systems within an enterprise. The ICAN Suite 100 can also deliver a fully distributed, centrally managed solution for the assembly, deployment, and management of enterprise-scale, end-user applications. In one implementation, the ICAN Suite 100 provides an open, standards-based, service-oriented architecture. In one implementation the ICAN Suite 100 includes a Java 2 Platform, enterprise edition ("J2EE") certified, portable, and integrated composite application network. The ICAN Suite 100 can enable the creation of composite applications including enterprise-scale, interactive, end-user applications that span multiple, cross-organizational business processes to connect people, systems, and devices as required. In another implementation, the ICAN Suite 100 allows business users, as well as developers, to easily create interactive applications that call on available business processes and web services, packaging pages together as a coordinated composite application. One example of ICAN suite 100 is available from SeeBeyond, Inc.

In one implementation, the ICAN Suite 100 includes twelve core engines including a composite application engine 102, a composite view application engine 104, a business activity monitoring engine 106, a portal composer 108, a transform and load integrator 110, a service bus 112, an integration platform 114, a business process manager 116, an exchange integrator 118, a management integrator 120, an adapter engine 122, and global identifier engine 124.

The composite application engine (referred to as eVision Studio) 102 can enable the design and generation of interactive web and wireless composite applications, and in one implementation, without any programming. The composite application engine 102 can create end-user business interfaces that overlay composite applications and workflow management.

The composite view application engine (referred to as eView Studio) 104 can enable the design and generation of "single-view" composite applications for cleansing, matching, and indexing user-defined business objects. For example, the user-defined business objects can include customers, businesses, or products that are not uniquely identified across all enterprise systems.

The business activity monitoring ("BAM") engine (referred to as eBAM Studio) 106 is a tool for rapidly designing and generating BAM composite applications without any programming. The BAM composite applications can include real-time alerts, graphical dashboards and reports, and a display of key performance indicators ("KPI") as defined by one or more business users.

The portal composer (referred to as ePortal Composer) 108 is a full-featured portal generation tool that can provide aggregation of one or more web-based channels with content personalization and administration services.

The transform and load integrator (referred to as the eTL Integrator) 110 can provide Extract, Transform, and Load ("ETL") functionality optimized for very large record set and bulk data transformation and movement scenarios.

The service bus (referred to as the eInsight Enterprise Service Bus) 112 can provide coordination for enterprise web services.

The integration platform (referred to as eGate Integrator) 114 can provide a web services and J2EE-based integration platform.

The business process manager (referred to as eInsight Business Process Manager ("BPM")) 116 can provide an open and web services-based business process management solution.

The exchange integrator (referred to as eXchange Integrator) 118 can provide a solution for defining trading partner profiles and protocol management for business-to-business interoperability.

The management integrator (referred to as eXpressway Integrator) 120 can provide management capabilities for streamlined distribution, configuration, and management of the various engines and services within the ICAN Suite 100.

The adapter engine 122 can provide a line of pre-built adapters (referred to as eWay Intelligent Adaptors) for common applications and data stores. In one implementation the adapter engine 122 can support Java Cryptography Architecture ("JCA") as well as expose applications as web services. In one implementation, the adapter engine 122 can include more than 80 pre-built adapters.

The global identifier engine (referred to as eIndex Global Identifier) 124 can provide an indexing solution for web-based access and user configuration of matching criteria.

The eVision Studio

The eVision Studio 102 provides a graphical environment for rapid design and generation of interactive composite web applications, in one implementation, without requiring any coding or other programming. In one implementation, the eVision Studio 102 includes a page layout designer for creating web pages and a page flow designer for managing web pages within a composite application. Within the ICAN Suite 100, the eVision Studio 102 can create end-user business interfaces for use within composite applications, workflow management, and business activity monitoring. In one implementation, the eVision Studio 102 can provide a user interface allowing a user to design web pages including real time presentations of one or more real world conditions.

In one implementation, the eVision Studio's graphical user interface ("GUI") components can gather input data from the user of one or more web pages at run time. In another implementation, the GUI components can provide additional functions and user interactivity to web pages. In one implementation, different classes of GUI components can include HTML Objects and Form Objects. The HTML Objects and Form Objects can include web-centric design elements, for example, check boxes, text boxes, graphics containers, horizontal (separator) lines, and submit buttons. The GUI components can be pre-built combinations of Java classes and JavaServer Pages ("JSP") code representing particular web interface elements. In one implementation, the GUI components can be selected and moved to a particular position in the page layout during development of a web page using drag and drop techniques. In another implementation, the eVision Studio 102 also includes property sheets. Property sheets allow a user, such as a web developer, to add labeling, functionality, and appearance attributes displayed by the GUI components of a developed web page at run time.

Through the use of drag-and-drop techniques and property sheets, the eVision Studio 102 can allow a user, (e.g., a web developer) to interactively add graphics, text, and programmatic content to web application pages. In one implementation, one or more pre-built GUI components can be dragged from one or more component palettes and positioned on a design canvas using the eVision Studio 102. In one implementation, functional and/or appearance attributes can be added to the GUI components, for example, in a properties window or other user interface. The user can preview the web page, (e.g., using a browser) throughout the development process.

ICAN Suite Integration

Figure 1B:
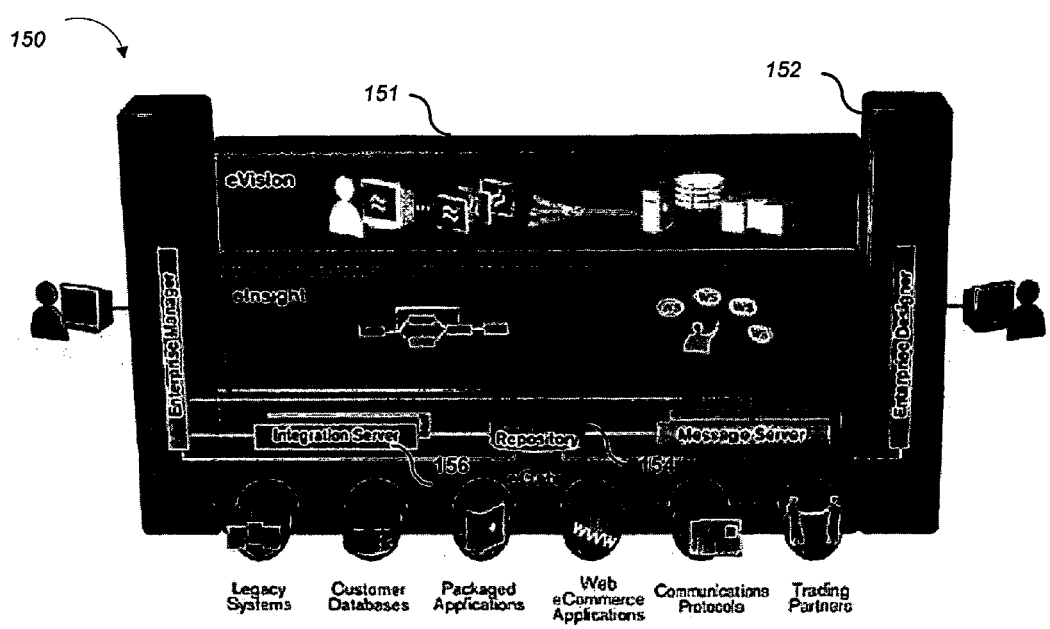
FIG. 1B shows the eVision Studio as part of the ICAN Suite.

In one implementation, the eVision Studio 102 is tightly integrated with the ICAN Suite 100 and can run, for example, as a component within the ICAN Suite environment. FIG. 1B shows one implementation of an eVision Studio 151 integrated within an ICAN Suite 150. The ICAN Suite 150 can include an enterprise designer 152 for providing a user interface for developing web pages. The enterprise designer 152 can include a page layout designer and page flow designer as components within the enterprise designer 152. The web applications of the eVision Studio 151 can be stored in a repository 154. In one implementation, the eVision Studio 151 runs as a component of the enterprise designer 152. Page layouts, page flows, GUI components, and deployment profiles can also be stored in the repository 154. In one implementation, the ICAN Suite 150 also includes an Integration Server 156 that includes a page flow engine, which coordinates process-related activity of a deployed integration project.

The steps for web application development using the eVision Studio 151 can include page layout, page linking, page flow, and binding and deployment. Page layout can include using the page layout designer to create one or more web pages having pre-built GUI components. Page linking can include using, for example, a page link wizard to create links to or between web pages and to pass parameters from one page to another. Page flow can include using the page flow designer to join finished web pages to create a logical flow of web pages, for example, for an underlying business process. Finally, binding and deployment can include deploying the web application into an environment for integration with other ICAN Suite 150 run time components.

Page Flow Designer

The page flow designer can facilitate a flow of web-based business activities. In one implementation, functions of the page flow designer can include page flow modeling, monitoring, and execution, as well as an analysis of how data messages flow from page to page. The page flow designer can allow a user, such as a business analyst, to structure a workflow of a web application by modeling a high-level, logical, page-by-page flow that individual web page users can follow through the web application in order to complete a given task (i.e., the page flow). In another implementation, the business analyst user can also structure a web application's page flow using a set of intuitive, graphical modeling tools provided by the page flow designer. At run time, the page flow can drive a display of web pages and orchestrate interactions with one or more back-end systems. Through the deployment of web pages that are developed with the page layout designer and page flow designer tools, the business analyst can provide enterprise-wide, internal and external access to web applications across networks such as an intranet, or the Internet.

Page Flow Engine

In one implementation, the web pages and page flows include web application elements that can allow run time users of the web pages to interact with back-end systems for executing one or more tasks requiring human analysis and/or intervention. One example of a task requiring human intervention in this context is providing credit approval based on a credit report. A page flow can be engineered to guide the user through a page-by page process of data viewing and task execution. At run time, instances of the process can be evaluated and then assigned to a proper group, user, or role. The assignee can then use the web application to finish the required tasks.

In one implementation, the page flow engine can orchestrate system responses to an execution of web page component code. At run time, the page flow engine can execute page links, receive and process user input, and, based on human interaction, move a viewer from page to page until an underlying process is complete.

Page Layout Designer

The page layout designer can allow a user of the page layout designer (e.g., a web designer) to specify details of individual web pages in the application using, for example, drag-and-drop techniques to place GUI components (i.e., web page design objects) onto a design canvas of the eVision Studio 151. The page layout designer can provide a collection of pre-built GUI components for use by the user in designing web pages. In one implementation, the page layout designer includes a web editor using a "what you see is what you get" ("WYSIWYG") architecture.

Using the drag-and-drop techniques and text-based property sheets, the page layout designer can allow the user to interactively add graphics, text, and programmatic content to the web pages in an application. The page layout designer can provide the user with a canvas for laying out or modifying web page components. In one implementation, the page layout designer includes a toolbar that allows the user to manipulate the components placed on the canvas.

The page layout designer also includes one or more palettes of GUI components. The user can select a GUI component from a palette including one or more pre-built GUI components. The user can drag one or more pre-built GUI components from a component palette and position the GUI components on the canvas. In one implementation, each GUI component's property sheet is opened automatically when the GUI component is placed on the canvas. The property sheet can include user modifiable attributes, such as the component's logical name and user-facing text to be displayed on the web page. As the user creates web pages, a preview of the design of each resultant web page can be viewed, e.g., using a browser.

Figure 2:
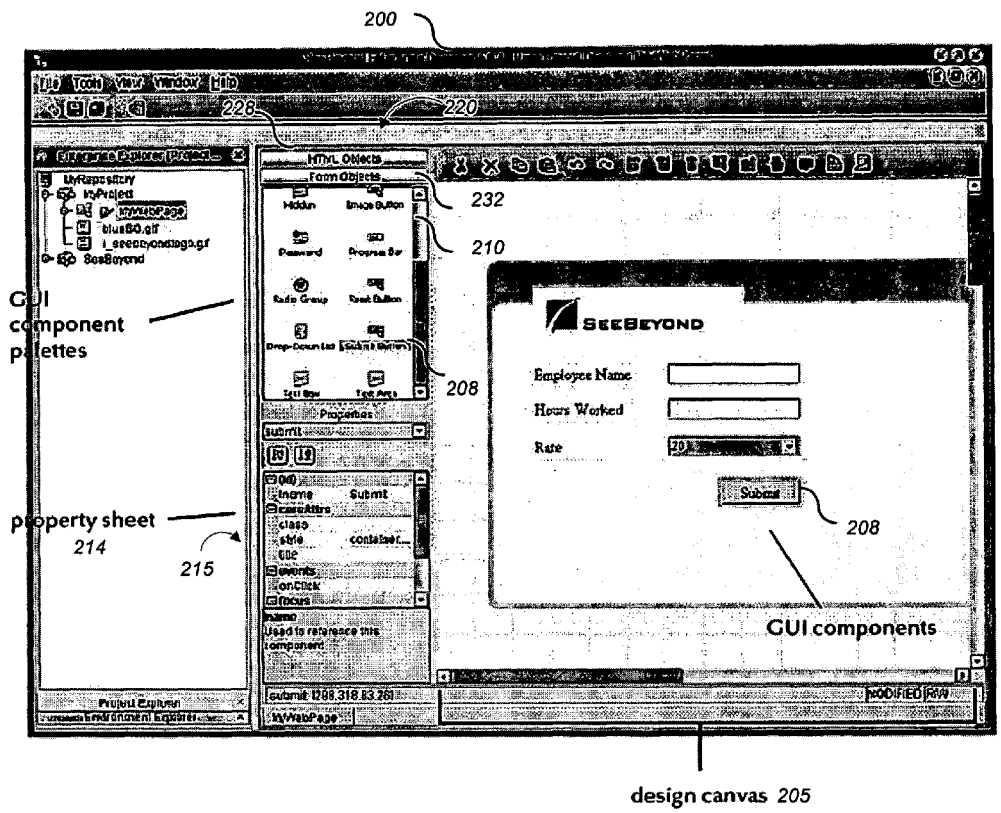
FIG. 2 shows the page layout designer.

FIG. 2 illustrates an example of a page layout designer 200. The page layout designer 200 provides web design elements, such as check boxes, text boxes, drop-down lists, graphics containers, horizontal lines, and submit buttons. In one implementation, the GUI components can be pre-built combinations of Java classes and JSP code that represent web interface elements. When the user places a GUI component (e.g., submit button 208) on the canvas 205, the particular component's property sheet can open automatically in the page layout designer 200. In the page layout designer 200, the upper left pane 210 contains one or more GUI component palettes 220. The GUI component palettes are discussed in further detail below.

In one implementation, a properties window 215 displays the property sheet of a selected GUI component. Alternatively, the properties window 215 can display properties of the overall page layout, for example, if no GUI component is selected. The property sheet can allow the user to customize the behavior of the GUI component or page layout. In the property sheet, the user can add labeling, functionality, and appearance attributes for the GUI component to have when the GUI component is presented to a user as a web page. In one implementation, an upper portion of the properties window can show an active property type and one or more properties associated with the particular property type. For example, the property type for the overall page layout is "page" and the displayed properties include the page title, background color, style sheet (e.g., a file containing the definition of the font and font properties such as color and size), and refresh properties. In another example, property types for GUI components can include "image," "form," and "HTML text". Different properties can be shown for each property type. For example, properties of the "image" property type can include the logical name of the image, the title of the image, and the height and width of the image. In one implementation, the user can modify the properties of the selected GUI component within the properties window 215. Each GUI component can have one or more property types. In one implementation, when a GUI component is selected on the canvas 205, a properties dropdown arrow can allow the user to change the property type or property values of the GUI component.

Adding GUI Components to a Page Layout

Figure 3:
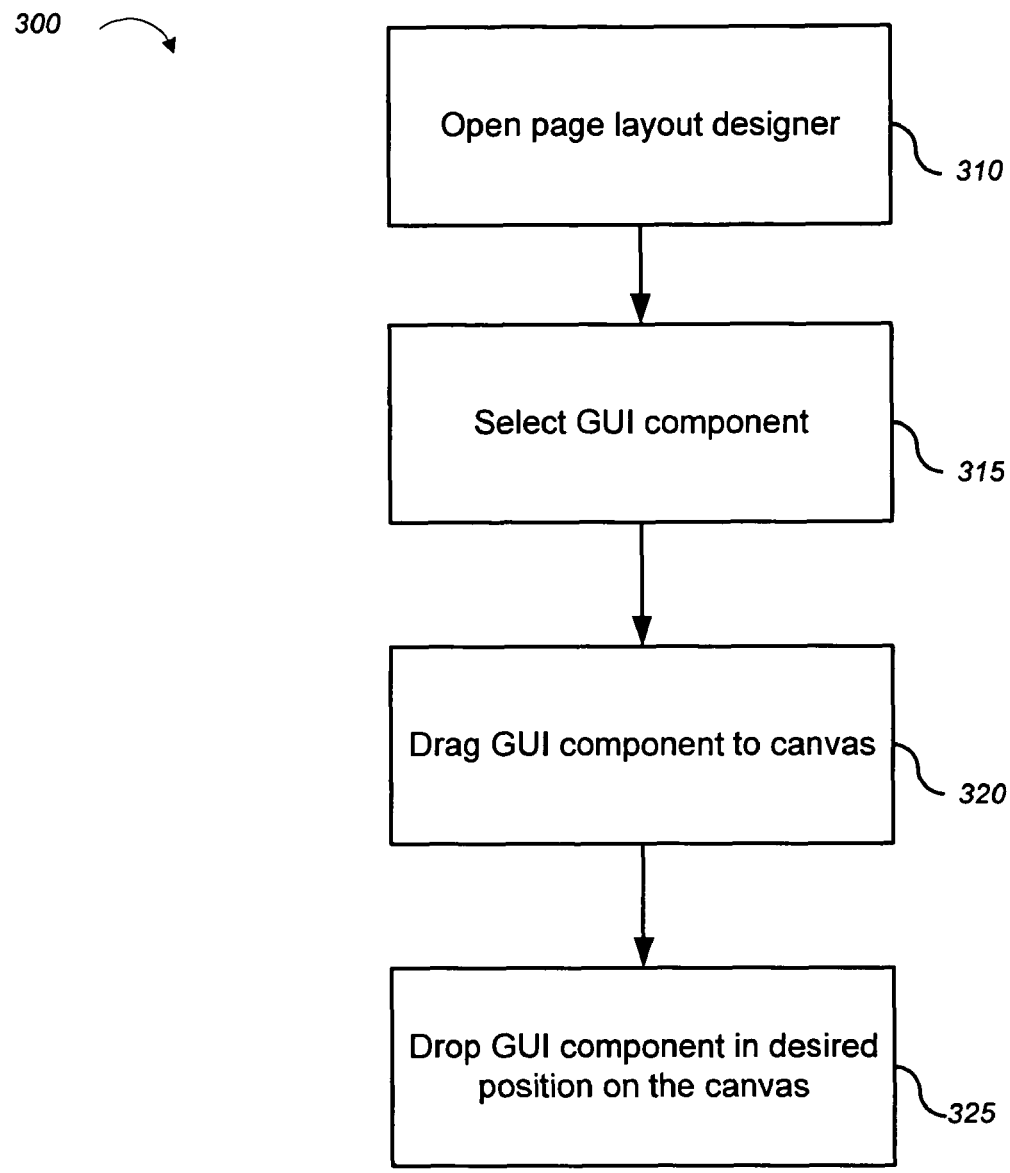
FIG. 3 is a flow chart of a process for adding a graphical user interface ("GUI") component to a web page layout.

In one implementation, the GUI components can input data from the user at run time, as well as add different functions and user interactivity to web pages. FIG. 3 illustrates a process 300 for adding a GUI component to a web page. To add a GUI component to a web page, the user first opens a page layout within the eVision Studio (e.g., eVision Studio 151), which provides the page layout designer (e.g., page layout designer 200) (step 310). In one implementation, the user can open a new page layout providing a blank canvas (e.g. canvas 205) to the user. Alternatively, the user can open an existing page layout within for editing an existing web page.

The user can then select a particular GUI component (e.g. GUI "submit button" component 208) from a component palette (e.g., component pallets 220) (step 315). For example, the user can select a particular GUI component using an input device such as a mouse. The component palettes can include a HTML Objects palette and a Form Objects palette.

The user can then position the selected GUI component, for example by dragging (e.g., by moving the mouse while holding the GUI object) the selected GUI component onto the canvas of the page layout designer (step 320). After positioning the GUI component at a desired canvas position, the user can drop the component onto the canvas (e.g., by releasing the mouse button) for incorporation into page layout for a particular web page (step 325).

GUI Component Palettes

Referring back to FIG. 2, the page layout designer 200 includes component palettes 220 that allow the user to drag and drop various GUI components onto the canvas 205 in order to quickly create a web page layout from the a collection of pre-built GUI components. The page layout designer 200 shows two different component pallets, a Form Objects palette 232 and a HTML Objects palette 228. When the user places a selected GUI component (e.g., GUI component 208) on the canvas 205, the user can then customize the GUI component's functional and visual presentation properties in the properties window 215.

In one implementation, multiple palettes can be stacked in the page layout designer 200. To access the GUI components of a particular palette, the user can select a visible title bar of the desired palette in order to expand the particular palette.

Figure 4:
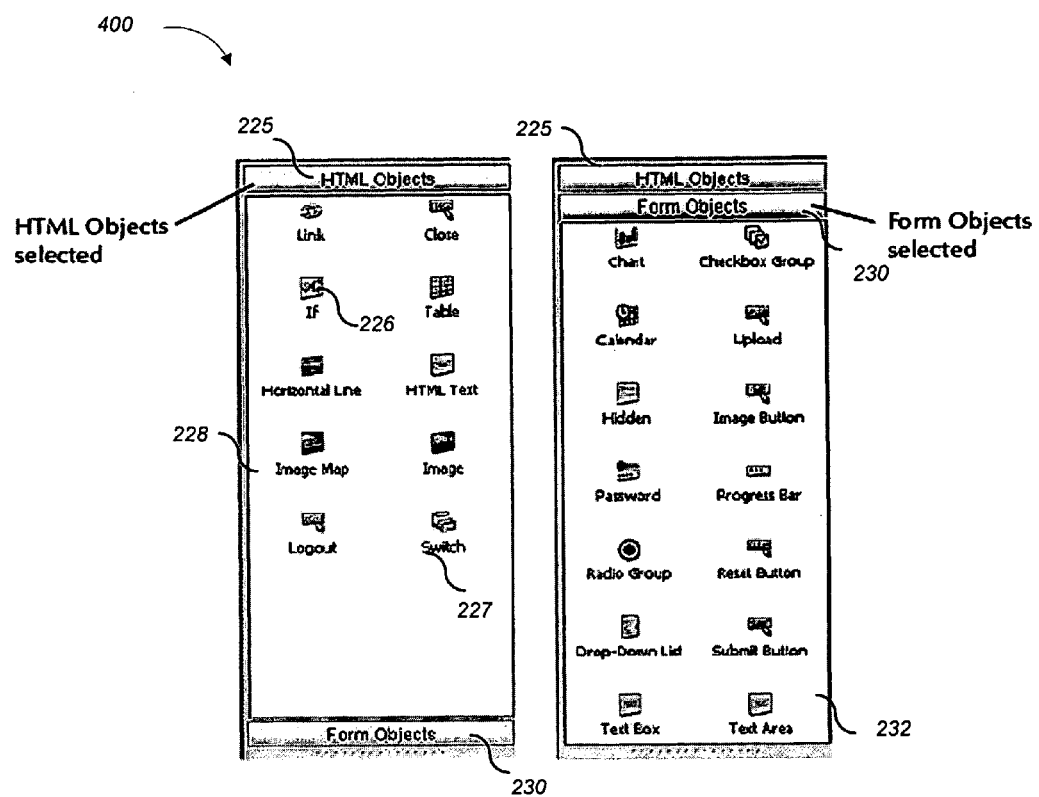
FIG. 4 shows the Hypertext Markup Language ("HTML") Objects and Form Objects palettes.

For example, to access the HTML Objects palette 228, the "HTML Objects" title bar can be selected. Similarly, to access the Form Objects palette 232, the "Form Objects" title bar can be selected. FIG. 4 illustrates an example of the palettes 400 for the HTML Objects and the Form Objects illustrating the GUI components displayed for selection when the particular palette is selected.

Form Objects

Form Objects are GUI components representing pre-built combinations of, in one implementation, Java classes and JSP code representing web interface entities. The Form Objects allow users to communicate with page flows in a run time environment. GUI components can be selected from the Form Objects palette 232 and positioned on a canvas of a page layout using, for example, drag and drop techniques. Examples of GUI components from the Form Objects palette 232 are described below in Table 2.

TABLE 2

| Object | Purpose |
| --- | --- |
| Chart | Creates a two-dimensional chart. Predefined chart types include area charts, bar charts, line charts, and pie charts. |
| Checkbox Group | Creates a group of check boxes. User selection of a check box at run time indicates inclusive user selection. The user can create multiple check boxes within a group. |
| Calendar | Adds a calendar under a drop-down arrow. At run time of a web page having a Calendar component, selecting a date on the calendar automatically populates one or more attached text boxes with the selected date. |
| Upload | Allows the user to upload files and data to an application. |
| Hidden | Creates a hidden text field (a text field that is hidden from users at run time), which can be used to pass session information to another page without being visible to users. |
| Image Button | Creates an image "hotspot" that the user can click to perform an action, such as launching an application or jumping to another internal Web page or an external web site. |
| Password | Creates a password input box. In one implementation, the password input box provides asterisks that mask the password. |
| Progress Bar | Creates a progress bar that allows the user to monitor the progress of a particular operation on a web page. |
| Radio Button | Switches an attribute or condition on or off. The user can create multiple buttons in a group. In one implementation, the value property cannot be empty. The radio object button can require that a value be assigned in order to pass a true/false condition. |
| Reset Button | Allows the user to cancel an operation or reset values to a default condition. |
| Drop-Down List | Allows the user to select an entry from a drop-down list. The user can create multiple entries on a list. |
| Submit Button | Allows the user to launch an operation or submit text to the application. Passes accumulated values to the ICAN Suite. |
| Text Box | Allows the user to type text that will be displayed on the web page surrounded by a bounding box. |
| Text Area | Allows the user to type an extensive body of text and place it anywhere on the web page without disturbing formatting. |

HTML Objects

The HTML Objects palette 228 allows the user to drag and drop HTML-based GUI components onto the canvas 205 of the page layout designer 200. The HTML Objects can be represented graphically on a web page and may or may not have programmatic attributes. Examples of GUI components from the HTML Objects palette 228 are described below in Table 1.

TABLE 1

| Object | Purpose |
| --- | --- |
| Link | Creates a link to another location, another page, or an external web site. Page links can be created using a page link wizard. |
| Close | Allows the user to close the browser window. The page flow is automatically ended. |
| IF | Allows the user to conditionally display an area of a page layout. If the value property is set to true, then the content inside this component (for example, a company logo) will appear at run time. If the value property is set to false, then the content will not appear at run time. |
| Table | Creates a table of rows and columns. Table cells can include any object from the HTML or Forms Objects palettes. A table can be static or dynamic. |
| Horizontal Line | Places a horizontal line on the canvas. The horizontal line object can be used to create visual separations in page layouts. The line is initially of a fixed length. To extend the line, the user can select (e.g. using an input device to place a pointer) an end that the user wants to change (right or left, up or down). The pointer can change to a "resize" arrow (<-->). The user can then drag the line end to modify the length. The bidirectional arrow cursor is dual-purpose. The user can add thickness to the line as well as adjust the length. To move the line, the user can select the line's mid-point (avoid the end points), and drag the line to a new location. |
| HTML Text | Creates a field on the canvas to hold HTML (static) text, or can act as a placeholder for dynamic text. The user can use the HTML text component for labels and general information on a page. |
| Image Map | Allows the user to create a "hotspot" on an image that a user can select to perform a link action, linking to another page or an area within the current web page. The user can import the base image the same way that the user imports a standard graphic image. In one implementation, images must reside in a project in the repository before the user can access them. |
| Image | Holds a static graphic image. When a user drags the image component onto the canvas, the user is prompted to select an image. In one implementation, the images must reside with a project in the repository before being selected. |
| Logout | Allows the user to exit the eVision web application. Clicking a button provided by the logout GUI component returns the user to the beginning of the page flow. |
| Switch | Allows the user to conditionally display an area of a page layout. The user can specify two or more cases and add different content to each case. To add a case, right-click the component and select "add case". The case property specifies the name of the case that appears at run time. |

IF Object

The IF Object 226 (FIG. 4) is a GUI component that allows the user of the page layout designer 200 to conditionally display web content, when presented as a web page at run time, based on a value in the property sheet for the IF Object 226. In one implementation, the value in the property sheet for the IF Object 226 can be entered or modified by a user in the page layout designer. If the value in property sheet matches a mapped run time value, then a particular web content associated with the IF Object 226, for example, a company logo, can appear on the presented web page at run time. Alternatively, if the value in the property sheet is set to false, then the content will not appear at run time.

The IF Object 226 can be applied to the canvas 205 for use in a web page by a user, for example, using a drag and drop process. The user can select the IF Object 226 from the HTML Objects palette 228 in the page layout designer 200. The user can then drag the IF Object from the HTML Objects palette 228 to the canvas 205. The dragged IF Object 226 can then be positioned on the canvas 205.

Switch Object

The Switch Object 327 (FIG. 4) is a GUI component that allows the user of the page layout designer 200 to conditionally display web content, when the page layout is presented as a web page at run time. In one implementation, the user of the page layout designer 200 can use the Switch Object 327 to specify two or more cases and add different content for each case. The user of the page layout designer 200 can add a case (e.g., a web page or other content to be presented to a web user at run time if specified conditions are satisfied) to the Switch Object 327, by selecting the Switch Object 327 GUI component positioned on the canvas 205 (e.g., by right-clicking the component) and select an "Add Case" menu item, for example, from a presented drop down menu. The user can specify the attributes of each case including the name of the case, identifying particular content mapped to the case, as well as the conditions for providing the content mapped to the case to a user of the web page. When a condition configured for a specified case is found to be true (e.g., the run time value fulfills one of the conditions), the content mapped to that case will be displayed to the web page user.

The Switch Object 327 can be applied to the canvas 205 for use in a web page by a user, for example, using a drag and drop process. The user can select the Switch Object 327 from the HTML Objects palette 228 in the page layout designer 200. The user can then drag the Switch Object 327 from the HTML Objects palette 228 to the canvas 205. The dragged Switch Object 327 can then be positioned on the canvas 205.

In one implementation, applications of the eVision studio 151 are based on a Model/View/Controller ("MVC") architecture. MVC is a software development paradigm that can provide for the building of software systems, particularly software systems that generate multiple, synchronized presentations of the same data. For example, MVC can be used to develop graphical statistical presentation applications providing simultaneous rendering of the same data in bar, line, and pie chart formats. The MVC architecture includes three types of objects: model objects, view objects, and controller objects.

The model objects represent data in a program that manages behaviors and data within an application. The model objects respond to requests for information about the model object's current state (typically requested by the view objects) and responds to instructions to change the model object's current state (typically requested by the controller objects).

The view objects manage the visual display of model object data; for example, displaying graphics and text to users in a browser.

The controller object enables user interaction with the model object's data; for example, mouse and keyboard inputs from the user, which instruct one or more model objects and/or view objects to perform an action.

The application architecture of the eVision studio 151 supports the MVC paradigm. In an eVision web application, user input, modeling of the external world, and visual feedback are managed by MVC objects, where each object is specialized for a task. For example, in one implementation, the model objects, represented by the eVision page flow, include business logic (e.g., object type definitions and collaborations) that interact with one or more back-end system applications. The view objects can include JSPs that are generated with a page layout designer. The controller object is a web-enabled page flow created with a page flow designer. The controller object orchestrates a sequence of pages being sent to the browser in response to user actions.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 5:
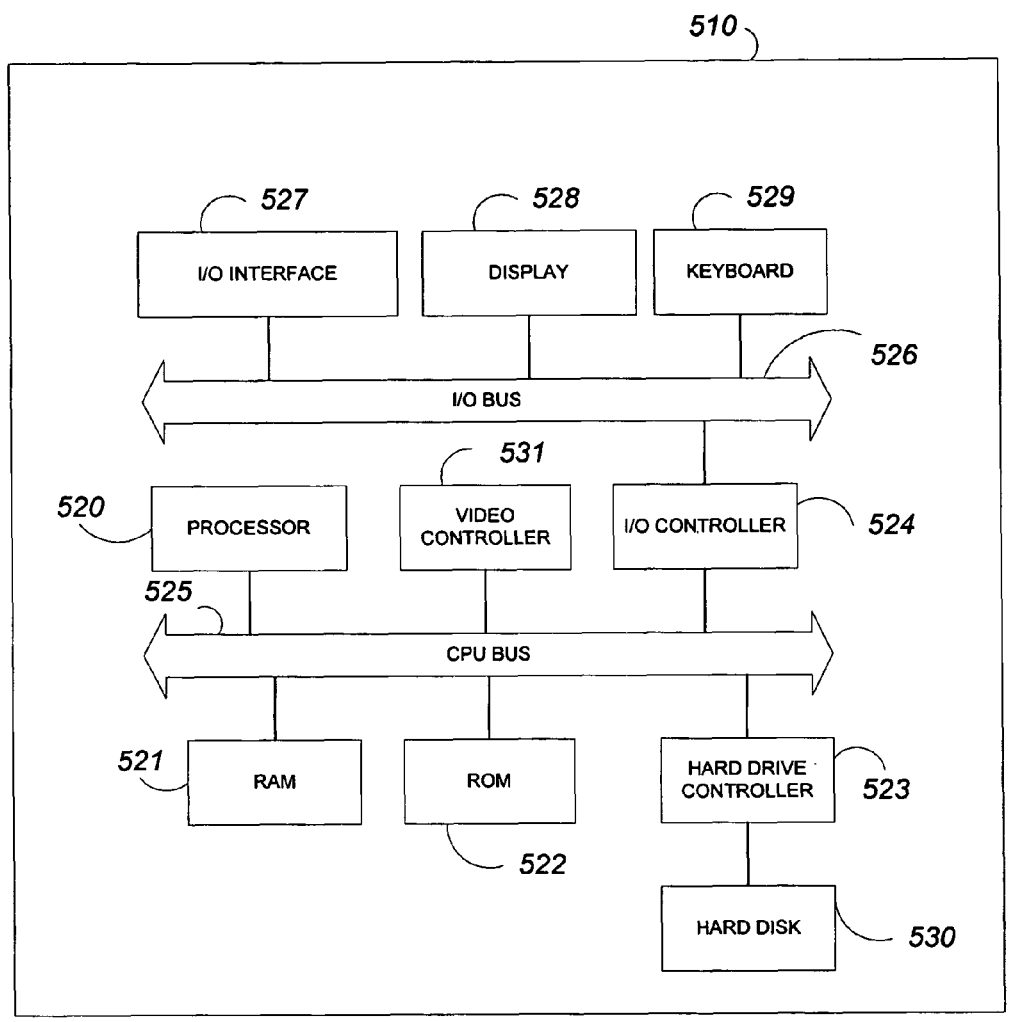
FIG. 5 shows a computer system.

An example of one such type of computer is shown in FIG. 5, which shows a block diagram of a programmable processing system (system) 510 suitable for implementing or performing the apparatus or methods of the invention. The system 510 includes a processor 520, a random access memory (RAM) 521, a program memory 522 (for example, a writable read-only memory (ROM) such as a flash ROM), a hard drive controller 523, a video controller 531, and an input/output (I/O) controller 524 coupled by a processor (CPU) bus 525. The system 510 can be preprogrammed, in ROM, for example, or it can be programmed (and reprogrammed) by loading a program from another source (for example, from a floppy disk, a CD-ROM, or another computer).

The hard drive controller 523 is coupled to a hard disk 530 suitable for storing executable computer programs, including programs embodying the present invention, and data.

The I/O controller 524 is coupled by means of an I/O bus 526 to an I/O interface 527. The I/O interface 527 receives and transmits data (e.g., stills, pictures, movies, and animations for importing into a composition) in analog or digital form over communication links such as a serial link, local area network, wireless link, and parallel link.

Also coupled to the I/O bus 526 is a display 528 and a keyboard 529. Alternatively, separate connections (separate buses) can be used for the I/O interface 527, display 528 and keyboard 529.

The invention has been described in terms of particular embodiments. Other embodiments are within the scope of the following claims. For example, the steps of the invention can be performed in a different order and still achieve desirable results.

What is claimed is:

1. A method for providing a graphical user interface ("GUI") component for a web page, comprising:
    selecting the GUI component associated with computer code for a conditional statement, wherein the GUI component is associated with a property sheet;
    positioning the GUI component on a layout design canvas for the web page;
    creating, within the GUI component, a first case associated with the conditional statement;
    associating, using the property sheet, the first case with first web content to be displayed within the GUI component;
    creating, within the GUI component, a second case associated with the conditional statement;
    associating, using the property sheet, the second case with second web content to be displayed within the GUI component;
    defining, using the property sheet, a first user-defined value and a second user-defined value for the conditional statement associated with the GUI component to obtain a modified conditional statement;
    creating a web page layout from the property sheet and the GUI component;
    generating the web page from the web page layout to obtain a resulting web page;
    displaying, at runtime and on a display device, the resulting web page comprising the first web content within the GUI component when the first user-defined value matches a mapped runtime value to render the modified conditional statement as true, wherein the resulting web page is displayed without the first web content within the GUI component when the first user-defined value does not match the mapped runtime value to render the modified conditional statement as true; and
    displaying, at runtime and on the display device, the resulting web page comprising the second web content within the GUI component when the second-user-defined value matches the mapped runtime value to render the modified conditional statement as true.

2. The method of claim 1, wherein positioning the GUI component comprises:
    selecting the GUI component from a plurality of pre-built GUI components.

3. The method of claim 1, wherein defining the first user-defined value comprises:
    receiving a user input defining the first user-defined value.

4. The method of claim 1, wherein positioning the GUI component comprises:
    opening a page layout designer for adding content to the web page, wherein the page layout designer comprises the layout design canvas and a plurality of selectable GUI components;
    selecting the GUI component from the plurality of selectable GUI components;
    moving the GUI component to the layout design canvas; and
    positioning the GUI component in a desired position on the layout design canvas.

5. A non-transitory computer readable medium comprising computer readable code for providing a graphical user interface ("GUI") component for a web page that, when executed by a processor, is configure to perform a method, the method comprising:
    selecting the GUI component associated with computer code for a conditional statement, wherein the GUI component is associated with a property sheet;
    positioning the GUI component on a layout design canvas for the web page;
    creating, within the GUI component, a first case associated with the conditional statement;
    associating, using the property sheet, the first case with first web content to be displayed within the GUI component;
    creating, within the GUI component, a second case associated with the conditional statement;
    associating, using the property sheet, the second case with second web content to be displayed within the GUI component;
    defining, using the property sheet, a first user-defined value and a second user-defined value for the conditional statement associated with the GUI component to obtain a modified conditional statement;
    creating a web page layout from the property sheet and the GUI component;
    generating the web page from the web page layout to obtain a resulting web page;
    displaying, at runtime and on a display device, the resulting web page comprising the first web content within the GUI component-when the first user-defined value matches a mapped runtime value to render the modified conditional statement as true, wherein the resulting web page is displayed without the first web content within the GUI component when the first user-defined value does not match the mapped runtime value to render the modified conditional statement as true; and displaying, at runtime and on the display device, the resulting web page comprising the second web content within the GUI component when the second-user-defined value matches the mapped runtime value to render the modified conditional statement as true.

6. The non-transitory computer readable medium of claim 5, wherein positioning the GUI component comprises:
selecting the GUI component from a plurality of pre-built GUI components.

7. The non-transitory computer readable medium of claim 5, wherein defining the first condition comprises:
receiving a user input defining the first user-defined value.

8. The non-transitory computer readable medium of claim 5, wherein positioning the GUI component comprises:
opening a page layout designer for adding web content to the web page, wherein the page layout designer comprises the layout design canvas and a plurality of selectable GUI components;
selecting the GUI component from the plurality of selectable GUI components;
moving the GUI component to the layout design canvas; and
positioning the GUI component in a desired position on the layout design canvas.

9. A system for providing a graphical user interface ("GUI") component for a web page, comprising:
a processor; and
a computer readable storage medium comprising computer readable code which, when executed by the processor, is configure to perform a method, the method comprising:
selecting the GUI component associated with computer code for a conditional statement, wherein the GUI component is associated with a property sheet;
positioning the GUI component on a layout design canvas for the web page;
creating, within the GUI component, a first case associated with the conditional statement;
associating, using the property sheet, the first case with first web content to be displayed within the GUI component;
creating, within the GUI component, a second case associated with the conditional statement;
associating, using the property sheet, the second case with second web content to be displayed within the GUI component;
defining, using the property sheet, a first user-defined value and a second user-defined value for the conditional statement associated with the GUI component to obtain a modified conditional statement;
creating a web page layout from the property sheet and the GUI component;
generating the web page from the web page layout to obtain a resulting web page;
displaying, at runtime and on a display device, the resulting web page comprising the first web content within the GUI component-when the first user-defined value matches a mapped runtime value to render the modified conditional statement as true, wherein the resulting web page is displayed without the first web content within the GUI component when the first user-defined value does not match the mapped runtime value to render the modified conditional statement as true; and
displaying, at runtime and on the display device, the resulting web page comprising the second web content within the GUI component when the second-user-defined value matches the mapped runtime value to render the modified conditional statement as true.

10. The system of claim 9, wherein the computer readable code is configured to position the GUI component by:
selecting the GUI component from a plurality of pre-built GUI components.

11. The system of claim 9, wherein the computer readable code is configured to define the first user-defined value by:
receiving a user input defining the first user-defined value.

12. The system of claim 9, wherein the computer readable code is configured to position the GUI component by:
opening a page layout designer for adding content to the web page, wherein the page layout designer comprises the layout design canvas and a plurality of selectable GUI components;
selecting the GUI component from the plurality of selectable GUI components;
moving the GUI component to the layout design canvas; and
positioning the GUI component in a desired position on the layout design canvas.

* * * * *